(12) United States Patent
Seetharaman et al.

(10) Patent No.: US 9,998,500 B2
(45) Date of Patent: Jun. 12, 2018

(54) METHODS AND SYSTEMS FOR PERFORMING LAWFUL INTERCEPTION (LI) IN COMMUNICATION NETWORKS INVOLVING CONTENT ADULTERATION WITH COLLUDING AGENTS

(71) Applicant: Wipro Limited, Bangalore (IN)

(72) Inventors: Swaminathan Seetharaman, Chennai (IN); Venkata Subramanian Jayaraman, Chennai (IN)

(73) Assignee: WIPRO LIMITED, Bangalore (IN)

( * ) Notice: Subject to any disclaimer, the term of this patent is extended or adjusted under 35 U.S.C. 154(b) by 198 days.

(21) Appl. No.: 15/083,967

(22) Filed: Mar. 29, 2016

(65) Prior Publication Data
US 2017/0237779 A1   Aug. 17, 2017

(30) Foreign Application Priority Data
Feb. 15, 2016  (IN) .............................. 201641005261

(51) Int. Cl.
  *H04L 29/06*   (2006.01)
(52) U.S. Cl.
  CPC ................................... *H04L 63/30* (2013.01)
(58) Field of Classification Search
  CPC ............. H04L 63/1408; H04L 63/1425; H04L 63/1466; H04L 63/30; H04L 63/306; H04W 12/02
  See application file for complete search history.

(56) References Cited

U.S. PATENT DOCUMENTS

| 7,209,473 B1 * | 4/2007 | Mohaban | H04L 29/06 370/235 |
| 2003/0074582 A1 * | 4/2003 | Patel | G06F 21/56 726/4 |

(Continued)

FOREIGN PATENT DOCUMENTS

EP    -1780945 A1 *   5/2007

OTHER PUBLICATIONS

Polčák, L. et al., "Hiding TCP Traffic: Threats and Counter-measures", Security and Protection of Information 2013, pp. 83-93.

(Continued)

*Primary Examiner* — Eric W Shepperd
(74) *Attorney, Agent, or Firm* — Finnegan, Henderson, Farabow, Garrett & Dunner LLP

(57) ABSTRACT

A method for lawful interception in a communication network involving adulteration by colluding agent is disclosed. The method includes activating, selectively, communication data duplication functionality in at least one of a plurality of network devices, each of the plurality of network devices being located in separate network segments of a communication path between users, the data duplication functionality duplicates data being communicated between the users; comparing, in real-time, a set of adulteration parameters derived from duplicated communication data received from the at least one of the plurality of network devices with associated thresholds within a set of thresholds to detect adulteration in the duplicated communication data; determining a confidence level of detecting adulteration in duplicated communication data received from the at least one of the plurality of network devices; and modifying number of network devices having active communication data duplication functionality based on the comparing and the confidence level.

23 Claims, 11 Drawing Sheets

(56) References Cited

U.S. PATENT DOCUMENTS

| | | | |
|---|---|---|---|
| 2007/0019543 A1 | 1/2007 | Wei et al. | |
| 2011/0149808 A1* | 6/2011 | Yared | H04L 29/06 370/259 |
| 2012/0069971 A1* | 3/2012 | Jayaraman | H04M 3/2281 379/35 |
| 2012/0250584 A1* | 10/2012 | Jayaraman | H04L 63/304 370/259 |
| 2014/0126474 A1* | 5/2014 | Eriksson | H04L 29/08729 370/328 |
| 2015/0074396 A1* | 3/2015 | Naslund | H04L 63/0807 713/168 |
| 2015/0127827 A1* | 5/2015 | Imbimbo | H04W 12/02 709/224 |
| 2015/0139087 A1* | 5/2015 | Luft | H04W 52/0251 370/329 |
| 2016/0072850 A1* | 3/2016 | Zhang | H04L 63/306 726/12 |
| 2016/0330330 A1* | 11/2016 | Bindrim | H04L 65/1013 |
| 2016/0373986 A1 | 12/2016 | Seetharaman et al. | |
| 2017/0093886 A1* | 3/2017 | Ovcharik | H04L 63/1408 |

OTHER PUBLICATIONS

Cronin, E. et al., "On the (un)Reliability of Eavesdropping", International Journal of Security and Networks, vol. 3. pp. 103-113, (2008).

Extended European Search Report Issued in the European Patent Office in counterpart European Application No. 16182526.4, dated Jul. 10, 2017, 6 pages.

\* cited by examiner

METHODS AND SYSTEMS FOR PERFORMING LAWFUL INTERCEPTION (LI) IN COMMUNICATION NETWORKS INVOLVING CONTENT ADULTERATION WITH COLLUDING AGENTS

TECHNICAL FIELD

This disclosure relates generally to lawful interception and more particularly to methods and systems for performing lawful interception in communication networks involving content adulteration with colluding agents.

BACKGROUND

In a multi-user communication scenario that includes one or more Lawful Interception (LI) target users, one or more of these users may manipulate media content in order to mislead a Law Enforcement Agency (LEA). The manipulation may be achieved by adulterating traffic generated from his/her system. The adulteration may also be caused by a colluding agent sitting between two communicating users. The adulteration is done such that only the intended recipient of the communication receives unadulterated content and the LEA receives adulterated content. This may be enabled as intermediate systems may interpret the adulterated communication content as unadulterated content or the adulterated content may be forwarded to the LEA without understanding that it is garbage. As a result, LI content is corrupted beyond interpretation by the LEA.

In conventional methods, adulterated packets are detected based on an offline analysis. The offline analysis may include analysis of histogram of the hop length of packets and thereafter determining minimum hop length for packets to reach the receiver. The offline analysis further includes analysis of average bytes per packet, and comparison with standard communication flows to determine possibility of an attack. Based on this analysis, the adulterated packets are removed thereafter. However, this method supports only Transmission Control Protocol (TCP) and is not suitable for online real-time detection of adulterated packets.

In other conventional methods, sensitivity of a network node that performs functionality of Content Duplication Function (CDF) is enhanced, such that, the network node collects all information that may help in detection of adulterated packets. The network node may also send out some probe packets to learn more about the network. Additionally, the network node may be placed as close as possible to the receiver. However, these conventional methods fail to address detection of adulterated packets (which have been adulterated at the network or higher layer) in a manner that complies with legal and regulatory requirements, irrespective of the CDF location, and without employing any probe packets to learn about the network.

SUMMARY

In one embodiment, method for lawful interception in a communication network is disclosed. The method includes activating, selectively, communication data duplication functionality in at least one of a plurality of network devices, each of the plurality of network devices being located in separate network segments of a communication path between users, the data duplication functionality duplicates data being communicated between the users; comparing, in real-time, a set of adulteration parameters derived from duplicated communication data received from the at least one of the plurality of network devices with associated thresholds within a set of thresholds to detect adulteration in the duplicated communication data; determining a confidence level of detecting adulteration in duplicated communication data received from the at least one of the plurality of network devices; and modifying a number of network devices having active communication data duplication functionality based on a result of the comparing and the confidence level.

In another embodiment, a system for lawful interception in a communication network is disclosed. The system includes at least one processor and a computer-readable medium. The computer-readable medium stores instructions that, when executed by the at least one processor, cause the at least one processor to perform operations that include activating, selectively, communication data duplication functionality in at least one of a plurality of network devices, each of the plurality of network devices being located in separate network segments of a communication path between users, the data duplication functionality duplicates data being communicated between the users; comparing, in real-time, a set of adulteration parameters derived from duplicated communication data received from the at least one of the plurality of network devices with associated thresholds within a set of thresholds to detect adulteration in the duplicated communication data; determining a confidence level of detecting adulteration in duplicated communication data received from the at least one of the plurality of network devices; and modifying a number of network devices having active communication data duplication functionality based on a result of the comparing and the confidence level.

In yet another embodiment, a non-transitory computer-readable storage medium for lawful interception in a communication network is disclosed, which when executed by a computing device, cause the computing device to: activate, selectively, communication data duplication functionality in at least one of a plurality of network devices, each of the plurality of network devices being located in separate network segments of a communication path between users, the data duplication functionality duplicates data being communicated between the users; compare, in real-time, a set of adulteration parameters derived from duplicated communication data received from the at least one of the plurality of network devices with associated thresholds within a set of thresholds to detect adulteration in the duplicated communication data; determine a confidence level of detecting adulteration in duplicated communication data received from the at least one of the plurality of network devices; and modify a number of network devices having active communication data duplication functionality based on a result of the comparing and the confidence level.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
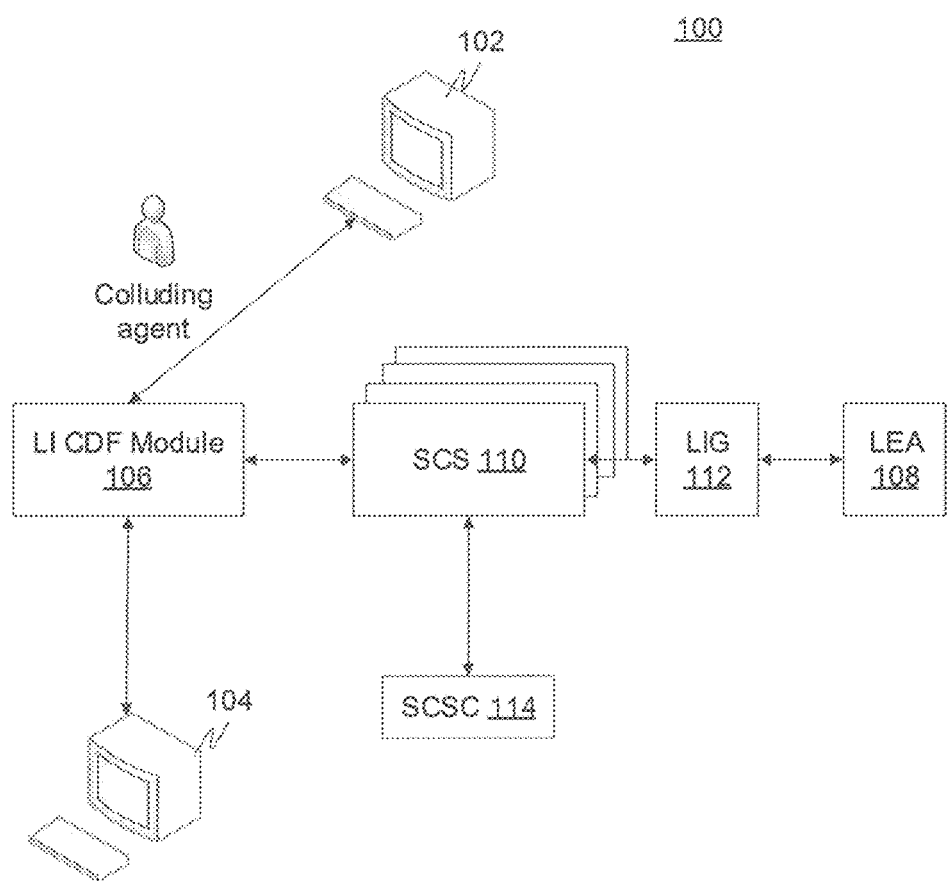
FIG. 1 illustrates an environment (that is exemplary) in which various embodiments may function.

Additional illustrative embodiments are listed below. In one embodiment, an environment 100 (that is exemplary) in which various embodiments may function is illustrated in FIG. 1. Environment 100 includes a target user 102 who initiates a communication session with a peer user 104. Target user 102 is identified for lawful interception, as a result, each communication session that involves target use 102 as a sender or a recipient is routed through a Lawful Interception (LI) Content Duplication Function (CDF) module 106. LICDF module 106 intercepts all communication sessions involving target user 102. The functionality of LICDF module 106 may be built in a network device or node within a network of target user 102. The network device or node is configured to perform data duplication functionality. Examples of these network devices or nodes may include, but are not limited to Routers, Switches, Gateways, Bridges, Modems, HUB, Multistation Access Unit (MAU). LICDF module 106 creates a copy of the contents of each communication session and sends these copies to a Law Enforcement Agency (LEA) 108 through a Session Continuity Server (SCS) 110 and an LI Gateway (LIG) 112.

An SCS controller (SCSC) 114 selects a network device or node that performs functionality of LICDF module 106 based on one or more of pre-provisioning by the operator, dynamic network conditions, and session characteristics. Accordingly, the selected network device or node initiates lawful interception and acts as LICDF module 106. Thereafter, LICDF module 106 starts sending copies of data packets in a communication session between target user 102 and peer user 104 to SCS 110. During the communication session, at least one of target user 102 or peer user 104 may adulterate the communication content using various adulteration methods. Additionally, a colluding agent may be present and may adulterate the communication content. Examples of such adulteration methods may include, but are not limited to sending fake data packets for which Time-To-Live (TTL) value is kept sufficiently small so that these fake data packets are dropped before reaching the designated user. The adulterated content is also sent along with the non-adulterated content in the communication session to SCS 110 by LICDF module 106.

Thereafter, SCS 110 performs suitable formatting and sequencing on data packets received from LICDF module 106 and sends these data packets to LIG 112. LIG 112 further sends these data packets exchanged between target user 102 and peer user 104 along with adulterated packets to LEA 108. Thus, data packets received by LEA 108 may not represent the actual conversation between target user 102 and peer user 104.

Figure 2:
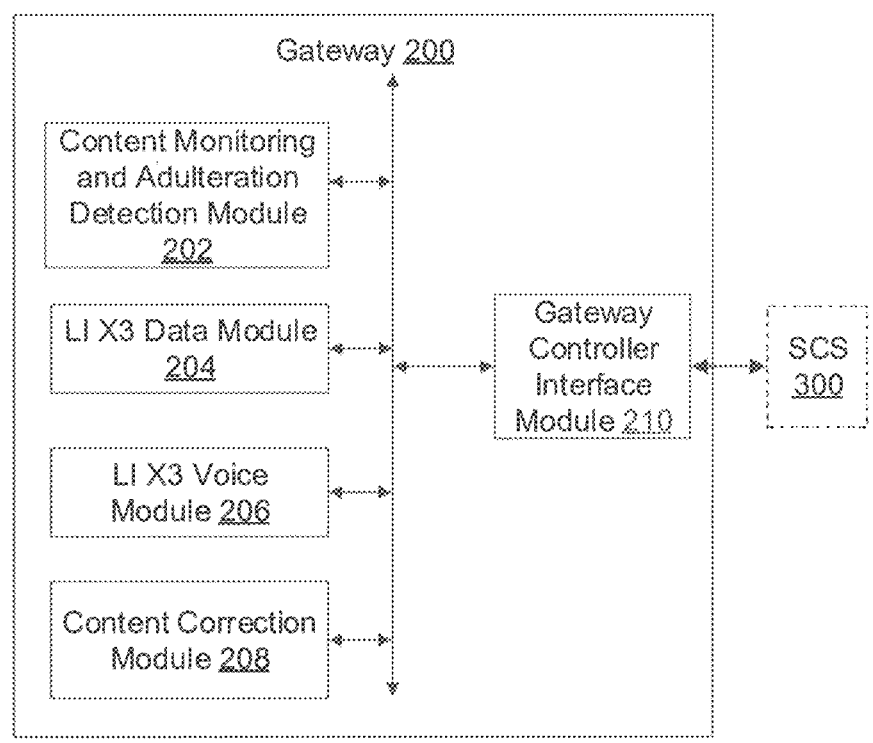
FIG. 2 is a block diagram illustrating various modules within a gateway that performs Lawful Interception (LI) content duplication functionality, in accordance with an embodiment.

Referring now to FIG. 2, a block diagram of various modules within a gateway 200 that performs lawful interception content duplication functionality is illustrated, in accordance with an embodiment. In addition to performing functionality of LICDF module 106, gateway 200 includes a Content Monitoring and Adulteration Detection (CMAD) module 202, an LI X3 data module 204, an LI X3 voice module 206, and a Content Correction (CC) module 208. FIG. 2 also shows an SCS 300 that communicates with gateway 200 and is analogous to SCS 110 shown in FIG. 1.

CMAD module 202 may receive instructions from SCS 300 to start or stop monitoring of the data exchanged and correct the detected adulterated in the exchanged data, if possible. Additionally, CMAD module 202 obtains relevant information from SCS 300 in order to monitor communication data exchanged between target user 102 and peer user 104 and to detect potential adulteration in real-time. The relevant information received from SCS 300 includes a set of thresholds associated with adulteration parameters. Additionally, the relevant information may include network topology related information, which is relevant to a session (for example, minimum number of hops between target user 102 and peer user 104 for the session); specific content-adulteration mechanisms (for example, IP hop length manipulation and filling certain unused protocol headers) to monitor based on provisioned or historical data of sessions involving target user 102 and/or peer user 104; and session-type specific monitoring inputs (for example, examining RTP headers in case of voice sessions, monitoring the interval of retransmission of same packet, and whether the retransmitted packet has different contents in case of TCP, use of unacceptable header values in case of UDP, and minimum content length of each packet).

CMAD module 202 may receive a trigger from SCS 300 to handover the functionality of monitoring data exchanged between target user 102 and peer user 104 and subsequently detecting adulteration in the data exchanged to SCS 300. In an embodiment, such handover may be initiated on insertion of a second gateway that performs content duplication functionality. Additionally, CMAD module 202 may also receive a trigger from SCS 300 to inform other relevant sub-systems of such change and send relevant information to SCS 300, which may include adulteration information collected by gateway 200.

To detect adulteration, CMAD module 202 receives from SCS 300 a set of adulteration parameters derived from the communication data by SCS 300 and compares the set of adulteration parameters with associated thresholds within the set of thresholds. The set of thresholds are also received by CMAD module 202 from SCS 300. The set of adulteration parameters may include, but are not limited to packets with insufficient hop length, filling unused protocol headers, invalid, not used, or intentionally misleading Real-time Transport Protocol (RTP) header contents (for example, an old time stamp), interval between retransmission of the same packet, difference in content of retransmitted packet, unacceptable protocol or packet header values, port changes, reset (RST) and other flag adulterations, packets with insufficient or invalid TTL contents, and packets with content length lower than the minimum possible content length for that packet type or protocol.

CMAD module 202 may also dynamically adapt each threshold in the set based on a set of network parameters that it monitors in real time. These set of network parameters may include, but are not limited to network congestion, link unavailability, network choke, packet queueing, buffer overflows, insufficient network coverage, network delays, packet drops, and users involved in session for the communication data. Based on a result of comparison of the set of adulteration parameter values with associated thresholds, whether adapted dynamically or not, CMAD module 202 determines adulteration in communication data exchanged between target user 102 and peer user 104. This is further explained in detail in conjunction with FIGS. 5 and 6.

To enable CMAD module 202 to perform the above computations, CMAD module 202 may communicate with LI X3 data module 204 for data sessions and LI X3 voice module 206 for voice sessions to receive information that may include one or more of timestamps of TCP packets and their acknowledgements to determine Round Trip Time (RTT), instances of retransmission of TCP packets by the source in quick succession or before re-transmission timer expiry, duplicate-acknowledgement reception for TCP packet, TCP packets being retransmitted with different contents each time; abnormal values in packet headers in protocols at the network layer (for example, IP), transport layer (for example, TCP, UDP, SCTP) or higher layers (for example, application layer protocols, like RTSP); trend of minimum hop length/TTL of TCP/SCTP packets below which the packets are dropped en route (i.e., before the packets reach the intended recipient) within a data stream.

After identifying adulteration, CMAD module 202 instructs each of LI X3 data module 204 and LI X3 voice module 206 to forward the identified adulteration information along with the communication data to CC module 208. When CMAD module 202 receives a handover trigger from SCS 300, it hand overs data correction functionality to SCS 300. To this end, CC module 208 sends relevant information to SCS 300 in order to enable SCS 300 to effectively perform data correction. In an embodiment, CC module 208 by itself analyzes adulterated content in the communication data to determine whether it is feasible to correct the adulterated content based on satisfaction of predefined criteria. The predefined criteria include meeting a confidence level of accuracy in correcting the adulterated content in the communication data. CC module 208, selectively corrects the adulterated content based on which confidence range the confidence level falls in. This is further explained in detail in conjunction with FIGS. 9A and 9B.

A Gateway Controller Interface (GCI) module 210 facilitates communication of gateway 200 with SCS 300. The communication enabled by GCI module 210 also includes instructions issued by SCS 300 to start or stop monitoring of data exchanged between target user 102 and peer user 104 in order to detect adulteration. This communication further includes seamless handover of adulteration detection and correction functionality from gateway 200 to SCS 300. Functionalities of SCS 300 are further explained in detail in conjunction with FIG. 3.

Figure 3:
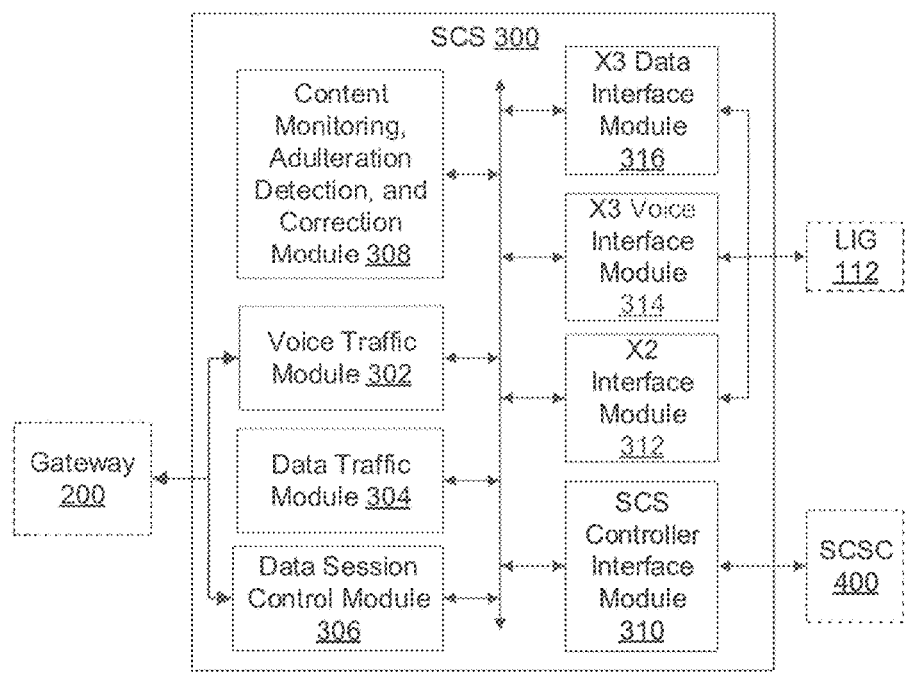
FIG. 3 is a block diagram illustrating various modules of a session continuity server, in accordance with an embodiment.

Referring now to FIG. 3, a block diagram of various modules of an SCS 300 is illustrated, in accordance with an embodiment. SCS 300 is communicatively coupled with gateway 200 and receives adulteration information along with the communication data from gateway 200. SCS 300 includes a voice traffic module 302, a data traffic module 304, a data session control module 306, a Content Monitoring, Adulteration Detection, and Correction (CMADC) module 308, an SCSC interface module 310, an X2 interface module 312, an X3 voice interface module 314, and an X3 data interface module 316.

For voice sessions, voice traffic module 302 communicates voice packets and signaling information to CMADC module 308 in response to instructions received from CMADC module 308. In an embodiment, such communication may be initiated when one or more thresholds are crossed. Alternatively, such communication may be initiated when more than one gateway 200 are performing content duplication functionality. Such communication may also be initiated to share information collected from other ongoing user sessions. Voice traffic module 302 further stores voice packets for a pre-provisioned duration in order to enable CMADC module 308 to detect adulteration and subsequently correct the adulteration. Additionally, when confidence level associated with correction of adulteration is low, voice traffic module 302 triggers CMADC module 308 to insert additional gateway 200 with content duplication functionality.

For data sessions, data traffic module 304 shares samples of user data packets with CMADC module 308 based on instructions received from either an SCSC 400 or CMADC module 308. In an embodiment, such communication may be initiated when one or more thresholds are crossed. Alternatively, such communication may be initiated when more than one gateway 200 are performing content duplication functionality. Such communication may also be initiated to share information collected from other ongoing user sessions. Data traffic module 304 further stores data packets for a pre-provisioned duration in order to enable CMADC module 308 to detect adulteration and subsequent correct the adulteration. Additionally, when confidence level associated with correction of adulteration is low, voice traffic module 302 triggers CMADC module 308 to insert additional gateway 200 with content duplication functionality. The communication of data traffic module 304 with an SCS Controller (SCSC) 400 in order to receive relevant information that is required for effective detection and correction of adulteration is facilitated by data session control module 306.

Data session control module 306 also facilitates communication of data traffic module 304 with CMADC module 308. CMADC module 308 receives information related to thresholds and information for monitoring and detection of adulteration in data exchanged between target user 102 and peer user 104 from SCSC 400. Using this information received from SCSC 400, CMADC module 308 sends instructions to voice traffic module 302 and data traffic module 304 to monitor data exchanged and report relevant information when one or more thresholds are crossed. The relevant information may also be reported periodically to CMADC module 308 by multiple gateways that have content duplication functionality. Such reporting may be done when data monitoring, adulteration detection, and correction functionalities are handed over to SCS 300 or when SCS 300 performs data monitoring, adulteration detection, and correction functionalities from the start of a user session.

CMADC module 308 may additionally instruct gateway 200 to initiate or terminate functionalities of monitoring data, detecting adulteration, and subsequent correction. After instructions to terminate these functionalities, CMADC module 308 may instruct gateway 200 to handover these functionalities to SCS 300. Thereafter, CMADC module 308 may provide relevant inputs to voice traffic module 302 and data traffic module 304 in order to determine possibility of correcting adulteration. Accordingly, CMADC module 308 also provides necessary information to voice traffic module 302 and data traffic module 304 to correct the adulteration based on inputs received from multiple gateways with content duplication functionality.

Based on the confidence level of correction, CMADC module 308 dynamically determines the need to insert or remove additional gateways with content duplication functionality. CMADC module 308 also dynamically adapts thresholds based on network conditions and network topology changes. Thereafter, CMADC module 308 shares this information with SCSC 400 in order to enable improved detection of content adulteration for future sessions between users.

The communication of various components of SCS 300 with SCSC 400 is enabled by SCSC interface module 310. The communication may include information that may enable effective detection and correction of adulteration even in presence of one or more colluding agents. Such information may include thresholds for requesting insertion or removal of additional gateways with content duplication functionality. In response to receiving this information, SCSC interface module 310 also communicates requests initiated by CMADC module 308 for removal or insertion of additional gateways to SCSC 400. Thereafter, the information associated with detection and subsequent correction of the adulteration in communication data and is forwarded to LIG 112 by X3 voice interface module 314 and X3 data interface module 316. X3 voice interface module 314 forwards information related to voice, while X3 data interface module 316 forwards information related to data. Additionally, X2 interface module 312 forwards signaling information to LIG 112, which is further explained in detail in conjunction with FIGS. 5 and 6. Various modules of SCSC 400 and their functionalities are explained in detail in conjunction with FIG. 4.

Figure 4:
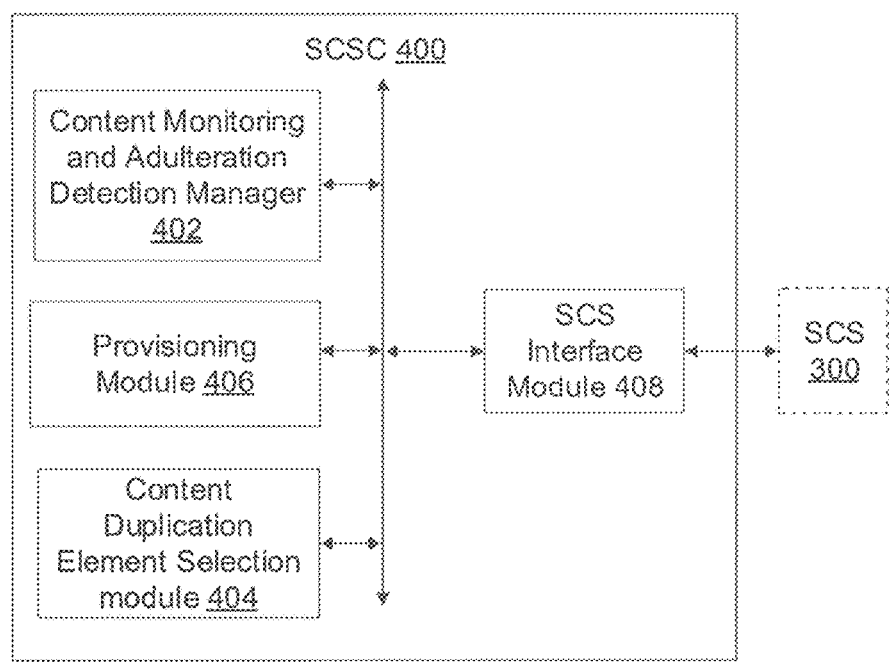
FIG. 4 is a block diagram illustrating various modules of a session continuity server controller for the session continuity server, in accordance with an embodiment.

Referring now to FIG. 4, a block diagram of various modules of SCSC 400 is illustrated, in accordance with an embodiment. SCSC 400 performs the functionality of selecting gateway 200 and SCS 300 for performing their respective functions. SCSC 400 includes a Content Monitoring and Adulteration Detection Manager (CMADM) 402, a Content Duplication Element (CDE) selection module 404, a provisioning module 406, and an SCS interface module 408.

CMADM 402 receives a trigger from CMADC module 308 for removal or insertion of gateways with content duplication functionality in order to enable effective detection and subsequent correction of adulteration. CMADM 402 also analyzes additional information that is received along with such a trigger in conjunction with data collected so far for various communication sessions between users. Such data may include, for example, ineffectiveness of a gateway with content duplication functionality if placed in certain locations due to presence of a colluding agent. Based on this analysis, CMADM 402 passes instructions to CDE selection module 404 for insertion or removal of one or more gateways having content duplication functionality.

CMADM 402 determines the set of adulteration parameters and computes the associated set of thresholds based on network topology and the selected gateways and SCS 300. Thereafter, CMADM 402 sends information for the set of thresholds to SCS 300. In an embodiment, CMADM 402 may perform these computations at start of a session, each time a new gateway is inserted/removed or when there is change in the session characteristics. The session characteristics may include, but are not limited to a new user being added to the session and one of the users being handed over to another network.

CMADM 402 also adapts various thresholds based on historical data and information about various communication sessions received from CMADC module 308. Such information may include but is not limited to type of adulteration done, involvement and role of colluding agents in the adulteration, adapted confidence levels and their effectiveness. These adapted threshold values are then used for future communication sessions. In other words, historical data of sessions are utilized for more accurate monitoring and detection of adulteration. CMADM 402 also sends relevant instructions to CMADC module 308 regarding whether SCS 300 or gateway 200 should perform the functionalities of monitoring data, detecting adulteration in data, and subsequently correcting the adulteration. Accordingly, CMADM 402 sends information to CMADC module 308. Such information may include, but is not limited to adulteration mechanisms used by a user and/or colluding agents in session involving the target user, relevant thresholds, and parameters that are require to be correlated.

Provisioning module 406 receives all provisioned inputs relevant to monitoring of communication data and subsequent detection of adulteration in the communication data. Additionally, provisioning module 404 receives all provisioned inputs relevant to a possible correction of detected adulteration in the communication data. These provisioned inputs may include, but are not limited to specific events related to a user, the set of thresholds, and the set of network parameters. These inputs are then communicated to CMADM 402.

Based on information received from CMADM 402, CDE selection module 404 may take a decision on removing or inserting gateways with content duplication functionality. The removal or insertion of gateways is done such that effective LI is ensured while optimizing use of network resources. The communication between SCSC 400 and various modules in SCS 300 is enabled by SCS interface module 406, which directly communicates with SCSC interface module 310.

Figure 5:
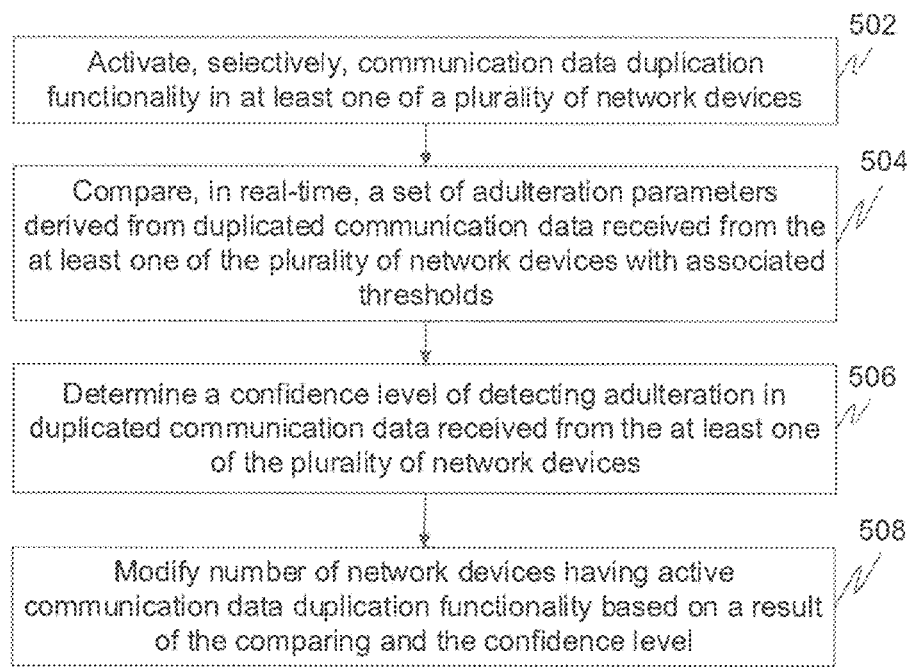
FIG. 5 illustrates a flow chart of a method for performing lawful interception in a communication network, in accordance with an embodiment.

Referring to FIG. 5, a flow chart of a method for performing lawful interception in a communication network is illustrated, in accordance with an embodiment. When communication session is set up between target user 102 and peer user 104 and a colluding agent is also involved in the communication, LEA 108 may initiate a lawful interception for target user 102 by selecting one or more network devices. A network device may be one or more gateways or SCS 300, which are selected by SCSC 400.

While initiating the lawful interception, LEA 108 may also provision information related to adulteration of data for communication sessions that involve target user 102 in SCSC 400. This information may include, but is not limited to maximum time for which the packets may be buffered when confidence level as to detection of adulteration is low, confidence level thresholds for content correction and corresponding actions, information associated with presence of colluding agents (for example, location of colluding agents and type of adulteration), and policy regarding initial placement of one or more gateways that have content duplication functionality. The policy, for example, may require that two such gateways be placed in different network segments at start of a communication session that involves target user 102. This may enable increase in effectiveness of lawful interception, as colluding agents are also involved in adulteration. This initial policy may be refined by SCSC 400 over time.

After initiation of lawful interception, a network device detects location of colluding agents and also the activity or mechanisms used by the colluding agents to add adulteration to the communication data exchanged between target user 102 and peer user 104. The location of colluding agents may be determined based on information received from CMADM 402 regarding pre-provisioned information provided by LEA 108. Alternatively, CMADC module 308 may later detect existence of one or more colluding agents and the adulteration mechanism used by them.

Thereafter, based on the information received from CMADM 402, CDE selection module 404, at 502, selectively activates communication data duplication functionality in one or more of a plurality of network devices. In other words, CDE selection module 404 inserts gateways that have content duplication functionality. The data duplication functionality enables a network device to create copy of the data being exchanged between users. In an embodiment, each of the plurality of network devices is located in separate network segments of a communication path between target user 102 and peer user 104 to effectively detect adulteration. The selective activation of content duplication functionality may also be based on additional factors that may include, but are not limited to path length between the users, load on network segments, and congestion levels of the network segments.

The one or more network devices then create a copy of the communication data and send duplicated communication data to voice traffic module 302 and data traffic module 304 in SCS 300. Voice traffic module 302 and data traffic module 304 then start monitoring the duplicated communication data. Additionally, these modules dynamically adapt a set of thresholds received from CMADM 402 based on a change detected in one or more network parameters.

Thereafter, in real-time, each of voice traffic module 302 and data traffic module 304 compare a set of adulteration parameters derived from duplicated communication data received from the one or more network devices with associated thresholds within the set of thresholds to detect adulteration in the duplicated communication data at 504. The set of thresholds may have already been dynamically adapted. The set of adulteration parameters may include but are not limited to packets with insufficient hop length, filling unused protocol headers, invalid, not used, or intentionally misleading RTP header contents (for example, an old time stamp), interval between retransmission of the same packet, difference in content of retransmitted packet, unacceptable protocol or packet header values, port changes, RST and other flag adulterations, packets with insufficient or invalid TTL contents, and packets with content length lower than the minimum possible content length for that packet type or protocol. In addition to the set of thresholds, CMADM 402 communicates lower threshold values to SCS 300 in order to identify adulterations that have a low confidence level of detection. This enables taking corrective actions to better detect adulteration by inserting or relocating gateways that have content duplication functionality.

Based on the comparison, when one or more of voice traffic module 302 and data traffic module 304 determine that observed values for one or more adulteration parameters cross associated thresholds, these modules communicate the information regarding breach of thresholds to CMADC module 308. Alternatively, this information may be communicated to CMADC module 308 periodically after pre-defined time intervals. The information may include but is not limited to actual contents of data packets that contributed to breach of thresholds, details of abnormal differences in data packet received from multiple gateways having content duplication functionality that caused breach of thresholds. This is further explained in detail in conjunction with FIG. 7.

Thereafter, at 506, CMADC module 308 performs an analysis on the information received from voice traffic module 302 and data traffic module 304 to determine a confidence level of detecting adulteration in duplicated communication data received from the one or more network devices. The confidence level of detecting adulteration may be computed separately for each gateway performing content duplication. In an embodiment, confidence level of detecting adulteration in duplicated content received from a gateway closer to a colluding agent may be much higher when compared to that for gateway farther from the colluding agent.

The above analysis is performed on the received information along with earlier reported data and historical inputs received from CMADM 402. The historical inputs may include but are not limited to mechanism used by target user 102 and colluding agent to cause adulteration. The analysis performed by CMADC module 308 may involve determining adulteration parameters that breached associated thresholds and correlation between values observed for different adulteration parameters. For example, the analysis may include determining number of TCP packets that have abnormal headers, number of packets that were retransmitted before a retransmission timeout, or number of duplicate acknowledgements received for an earlier transmitted packets.

Thereafter, based on a result of comparison performed by voice traffic module 302 and data traffic module 304 and the confidence level determined by CMADC module 308, CDE selection module 404 dynamically modifies a number of network devices having active communication data duplication functionality at 508. In other words, CDE selection module 308 may dynamically insert or remove gateways that have content duplication functionality. Such gateways are dynamically inserted or removed until confidence level for detection and correction of adulteration is beyond a minimum threshold. This ensures that an appropriate number of such gateways is employed for effective lawful interception. This is further explained in detail in conjunction with FIG. 8.

When an appropriate number of gateways that have content duplication functionality has been inserted, CMADC module 308 triggers voice traffic module 302 and data traffic module 304 to determine possibility of correcting adulteration in data exchanged between target user 102 and peer user 104. To this end, CMADC module 308 sends information to these modules. Such information may include, but is not limited to which gateway's duplicated communication data should be used for correcting adulteration, number and content of additional packets received from different gateways, and packets received from multiple gateways that have abnormal differences. This information may be used to perform analysis by each of voice traffic module 302 and data traffic module 304. Such analysis may include using content of additional packets sent by one of the gateways to determine whether these additional packets can be dropped and determining what are the abnormal differences in the content of packets sent by multiple gateways based on network topology and network conditions (for example, network congestion levels).

In case, each of voice traffic module 302 and data traffic module 304 determines that it is not possible to correct the adulteration with a confidence level above a minimum threshold, CMADC module 308 may interact with CDE selection module 404 to insert additional gateways with content duplication functionality. The minimum threshold value may be provisioned by LEA 108. In a scenario where CDE selection module 404 has already inserted an appropriate number of gateways, each of voice traffic module 302 and data traffic module 304 sends an indication together with the relevant information to LIG 112 regarding inability to correct the adulteration. The relevant information, for example, may include but is not limited to confidence level of possible adulteration correction and inability to identify exact adulterated packets.

However, in case each of voice traffic module 302 and data traffic module 304 determines that it is possible to correct one or more packets with the minimum confidence level, each of these modules performs correction of adulteration in data exchanged between target user 102 and peer user 104. To this end, these modules identify unwanted packets in the duplicated communication data received from a gateway closer to the colluding agent and removes these packets. These unwanted packets may include garbage or misleading content. The elimination of such unwanted packets depends on input confidence level of exact identification of such unwanted packets. The confidence level is the probability of identifying a packet correctly as an unwanted packet. The probability, in the case of connection-oriented protocols, for example, may be computed for a packet based on match between the packet and it's acknowledgement). An exemplary embodiment for correcting adulteration in communication data is discussed in detail in conjunction with FIGS. 9A and 9B.

After correcting the adulteration, each of voice traffic module 302 and data traffic module 304 send corrected communication data to LIG 112 through X3 voice interface module 314 for voice and X3 data interface module 316 for data. In an embodiment, when packets were removed with a confidence level between 65%-85%, removed packets are sent as a separate stream to LIG 112. Voice traffic module 302 and data traffic module 304 also sends relevant information, such as, confidence level of correcting the adulteration to CMADC module 308. Thereafter, CMADC module 308 sends information via X2 interface module 312 to LIG 112 and to CMADM 402. The information send to LIG 112 may include, but is not limited to type of adulteration done, entity that caused the adulteration (target user 102, peer user 104, or the colluding agent), role of colluding agents in adulteration, indication of inability to correct the adulteration content along with relevant information (when adulteration not corrected), relevant information on correction of adulteration (for example, output confidence level, information about packets removed with a lower confidence level.)

Each of voice traffic module 302 and data traffic module 304 then send information to CMADC module 308 to update the set of thresholds and historical data. Such information may include, but is not limited to number of packets whose contents differed abnormally between different gateways having data duplication functionality, difference in number of packets received from different such gateways (including and excluding retransmissions), any particular pattern (for example, one additional packet for every five packets), number and content of TCP packets which were below the hop length threshold but did not involve a retransmission, number and content of packets which included abnormal header contents but did not involve a retransmission, number and content of TCP packets which were above the hop length threshold by a certain number, but involved retransmission with different contents each time.

After receiving this information, CMADC module 308, forwards it to CMADM 402, which performs analysis on this information along with other information received from CMADC module 308 and locally collected information on effectiveness of gateways having content duplication functionality employed during the session to effectively detect adulteration. The result of this analysis is then used to adapt the set of thresholds and adulteration parameters, which are used for futures sessions that involve target user 102. Additionally, this information is used to update historical data of sessions involving target user 102 monitoring and detection of adulteration in future communication sessions. As a result, the method of lawful interception is auto-tuned after every communication session. This enables learning the appropriate number of gateways having active communication data duplication functionality, which should be activated in order to detect adulteration more quickly and efficiently.

Figure 6:
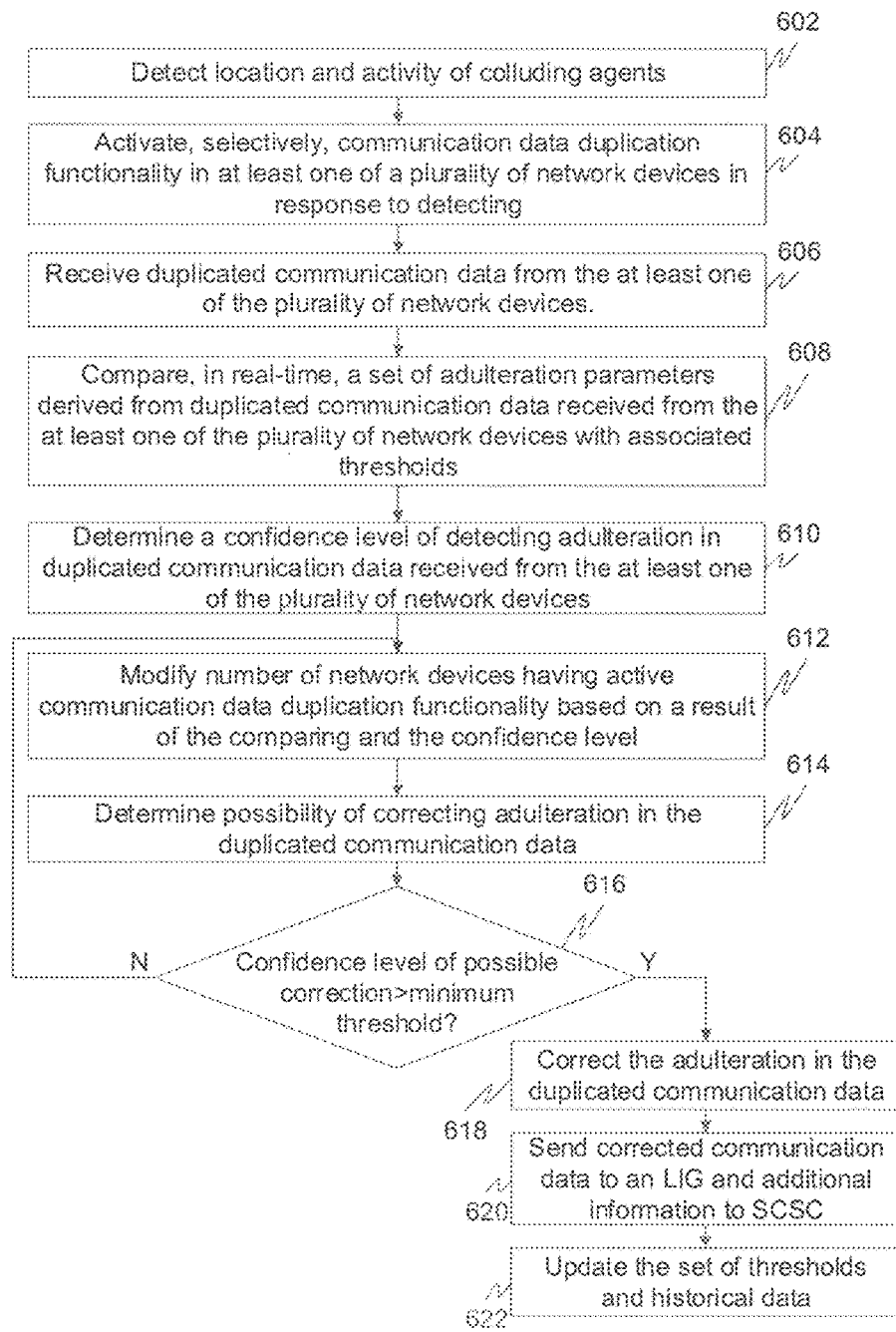
FIG. 6 illustrates a flow chart of a method for performing lawful interception in a communication network, in accordance with another embodiment.

Referring to FIG. 6, a flow chart of a method for performing lawful interception in a communication network is illustrated, in accordance with another embodiment. At 602, a network device detects location of colluding agents and also the activity or mechanisms used by the colluding agents to add adulteration to the communication data exchanged between target user 102 and peer user 104. Thereafter, at 604, data duplication functionality is selectively activated in one or more network devices among a plurality of network devices. At 606, duplicated communication data is received from the one or more network devices. A set of adulteration parameters are derived from the duplicated communication data and are then compared, in real-time, with associated thresholds at 608. This has been explained in detail in conjunction with FIG. 5.

Thereafter, at 610, a confidence level of detecting adulteration in duplicated communication data is determined. Based on the confidence level and result of the comparison done at 608, the number of network devices having active communication data duplication functionality is modified at 612. This is further explained in detail in conjunction with FIG. 8. At 614, possibility of correcting adulteration in the duplicated communication data is determined. A check is performed at 616 to determine if the confidence level of possibility of correction is greater than a minimum threshold. If the confidence level is less than the minimum threshold, control is returned to 612.

Referring back to 616, if the confidence level is greater than the minimum threshold, the adulteration in the duplicated communication data is corrected at 618. Thereafter, the corrected communication data is sent to LIG 112 and to SCSC 400 along with some additional information at 620. Lastly, at 622, the set of thresholds and historical data are updated by SCSC 400 based on received information. This has been explained in detail in conjunction with FIG. 5.

Figure 7:
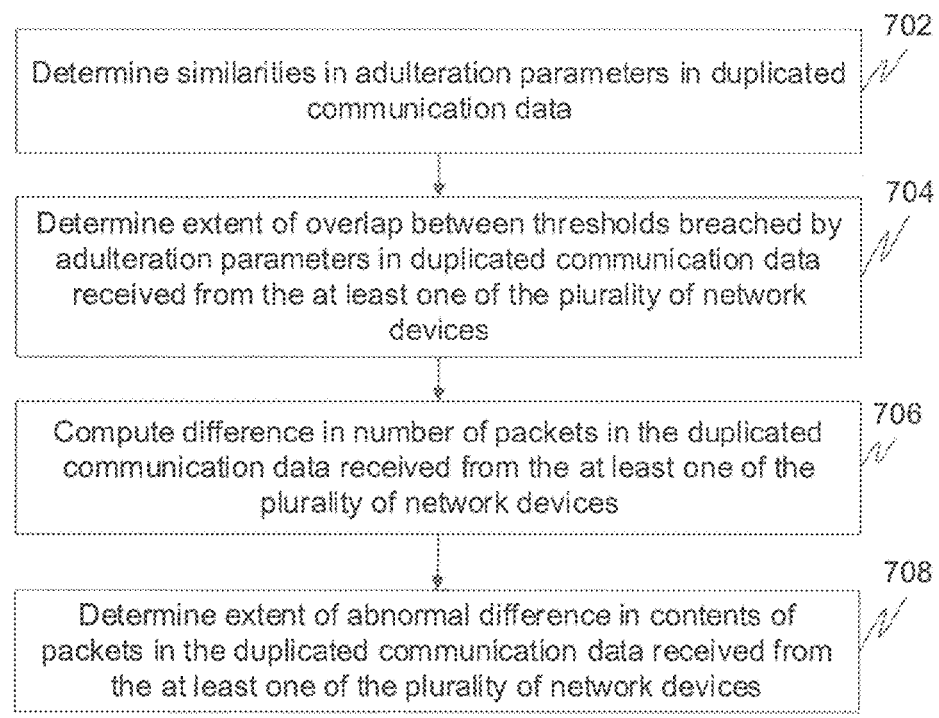
FIG. 7 illustrates a flow chart of a method of comparing adulteration parameter derived from duplicated communication data with associated thresholds, in accordance with an embodiment.

Referring now to FIG. 7, a flow chart of a method of comparing adulteration parameter derived from duplicated communication data with associated thresholds is illustrated, in accordance with an embodiment. After CMADC module 308 has determined a confidence level of detecting adulteration in duplicated communication data received from the one or more network devices, CMADC module 308 determining similarities in adulteration parameters in duplicated communication data received from multiple gateways having content duplication functionality at 702.

Thereafter, at 704, CMADC module 308 determines extent of overlap between thresholds breached by adulteration parameters in duplicated communication data received from the multiple gateways having content duplication functionality. At 706, CMADC module 308 computes a difference in number of packets in the duplicated communication data received from the multiple gateways having content duplication functionality. CMADC module 308 then determines extent of abnormal differences in contents of packets in the duplicated communication data received from the multiple gateways having content duplication functionality at 708.

Thereafter, CMADC module 308 determines possible adulterations scenarios. In an exemplary embodiment, possible adulteration scenarios and correction mechanisms are illustrated in Table 1 given below.

TABLE 1

| Adulterations Scenario | Target User 102 | First Agent | Second Agent |
|---|---|---|---|
| 1 | Fake packets inserted as normal packets | Adapting fake packets to ensure that they are dropped en route | Not present/do nothing |
| 2 | Fake packets inserted such that they are dropped en route | More fake packets inserted such that they are dropped en route | Not present/do nothing |
| 3 | Fake packets inserted such that they are dropped en route | More fake packets inserted as normal packets | Adapting fake packets to ensure that they are dropped en route |
| 4 | Fake packets inserted as normal packets | More fake packets inserted as normal packets | Adapting fake packets to ensure that they are dropped en route |
| 5 | Fake packets inserted as normal packets | More fake packets inserted such that they are dropped en route | Adapting fake packets to ensure that they are dropped en route |
| 6 | Do nothing | More fake packets inserted as normal packets | Adapting fake packets to ensure that they are dropped en route |
| 7 | Do nothing | More fake packets inserted such that they are dropped en route | Not present/do nothing |

Adulteration scenarios in Table 1 are worked out based on an assumption that there are two gateways having content duplication functionality. One of these two gateways, i.e., gateway 1, is beyond the colluding agent and the other gateway, i.e., gateway 2, is closer to target user 102, and there are one or two colluding agents involved in the adulteration apart from target user 102. The adulteration scenarios given in Table 1 may be applied based on result of the analysis performed by CMADC module 308 as given above. This is depicted by Table 2 given below:

TABLE 2

| Confidence level of adulteration detection in gateway 1 | Confidence level of adulteration detection in gateway 2 | Confidence level of adulteration detection in gateway 2 after removing similar adulteration parameters and/or similar packets | Overlap in the detection parameters | Abnormal differences in content of suspected packets | Additional packets (new or retransmissions) observed at gateway 2 | Adulteration scenarios applicable |
|---|---|---|---|---|---|---|
| Low | High | Low/Very low | Moderate | High | No | 1 |
| High | High | High | Low/very low | Moderate to high | Yes | 2 |
| High | High | Low | Moderate | Low | Yes | 3 |
| Low | Low | Low | Low to moderate | Moderate | Yes | 4 |
| Low | High | Low | Low to moderate | High | Yes | 5 |

TABLE 2-continued

| Confidence level of adulteration detection in gateway 1 | Confidence level of adulteration detection in gateway 2 | Confidence level of adulteration detection in gateway 2 after removing similar adulteration parameters and/or similar packets | Overlap in the detection parameters | Abnormal differences in content of suspected packets | Additional packets (new or retransmissions) observed at gateway 2 | Adulteration scenarios applicable |
|---|---|---|---|---|---|---|
| Very Low/Not applicable (no content adulteration detected) | Low | Low | Very low/not applicable | Moderate to high | Yes | 6 |
| Very Low/Not applicable (no content adulteration detected) | High | High | Very low/not applicable | Moderate to high | Yes | 7 |

Figure 8:
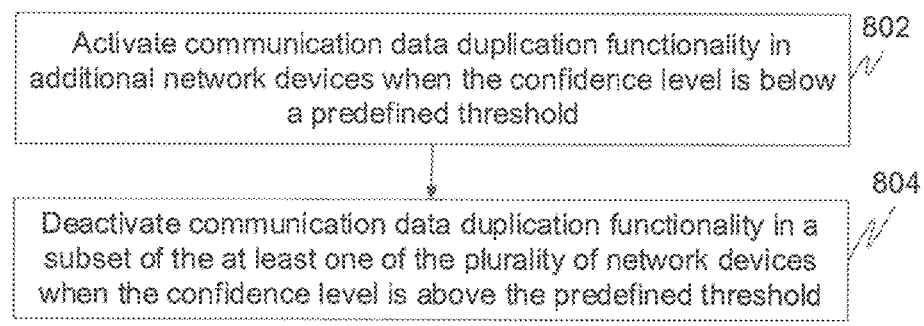
FIG. 8 illustrates a flow chart of a method for modifying the number of network devices that have active content duplication functionality, in accordance with an embodiment.

Referring now to FIG. 8, a flow chart of a method for modifying the number of network device that have active content duplication functionality is illustrated, in accordance with an embodiment. Once the mechanism that was used for adulteration has been determined as described above, CMADC module 308 takes action to improve effectiveness of lawful interception by employing an appropriate number of gateways that have content duplication functionality. To this end, at 802, CDE selection module 404 activates data duplication functionality in additional network devices when the confidence level is below a predefined threshold. However, if the confidence level is above the predefined threshold, CDE selection module 404 deactivates communication data duplication functionality in a subset of the one or more network devices at 804. In other words, content duplication functionality is deactivated in those gateways, which are redundant. In an exemplary embodiment, various scenarios of activation or deactivation of data duplication functionality in gateways are listed in table 3 given below:

TABLE 3

| Scenario | Activation/Deactivation of content duplication functionality in gateways for effective lawful interception |
|---|---|
| 1 | Dynamically insert an appropriate gateway beyond first agent if not present already), in addition to a gateway that is close to target user 102. May dynamically insert a third gateway close to peer user 104. Remove one or more gateways close to target user 102 and peer user 104 based on confidence level of identifying fake packets. |
| 2 | Dynamically insert an additonal gateway close to peer user 104. Subsequently, dynamically remove one or more gateways close to target user 102 and/or peer use 104 based on confidence level of identifying fake packets. |
| 3 | If required, dynamically insert an additional gateway beyond the second agent, based on the earlier placement of a gateway (if it was beyond the first agent). Alternatively, a gateway may be inserted close to target user 102. |
| 4 | Dynamically insert a gateway beyond the first agent (if not present already), in addition to a gateway close to target user 103. A third gateway may also be required to be dynamically inserted beyond the second agent. |
| 5 | Dynamically insert a gateway beyond the second agent in addition to a gateway close to target user 102 (and a gateway beyond the first agent if present/required). Dynamically remove the gateway beyond the first agent based on confidence level of identifying fake packets. |
| 6 | Dynamically insert two gateways, one before the first agent and another beyond the second agent (depending on earlier gateway placement). |
| | Dynamically remove a gateway before the first agent based on the confidence level of identifying fake packets. Alternatively, the gateway before the first agent alone may be retained. |
| 7 | Dynamically insert an additional gateway before the first agent based on the confidence level of identifying fake packets, if the chosen gateway is beyond the first agent. Later, the gateway beyond the first agent 1 may be removed. |

In an embodiment, CMADM 402 passes relevant instructions to the CDE selection module 404 taking into consideration recently received information from SCS 400 together with data collected earlier for the communication session, and relevant historical data. CDE selection module 404 checks the nature of the request (insertion or removal of a gateway) and also checks the last instant of gateway selection for the user session to avoid too frequent insertion or removal of gateways with content duplication functionality in order to prevent destabilization transmission of duplicated communication data and hence effectiveness of lawful interception.

Figure 9A:
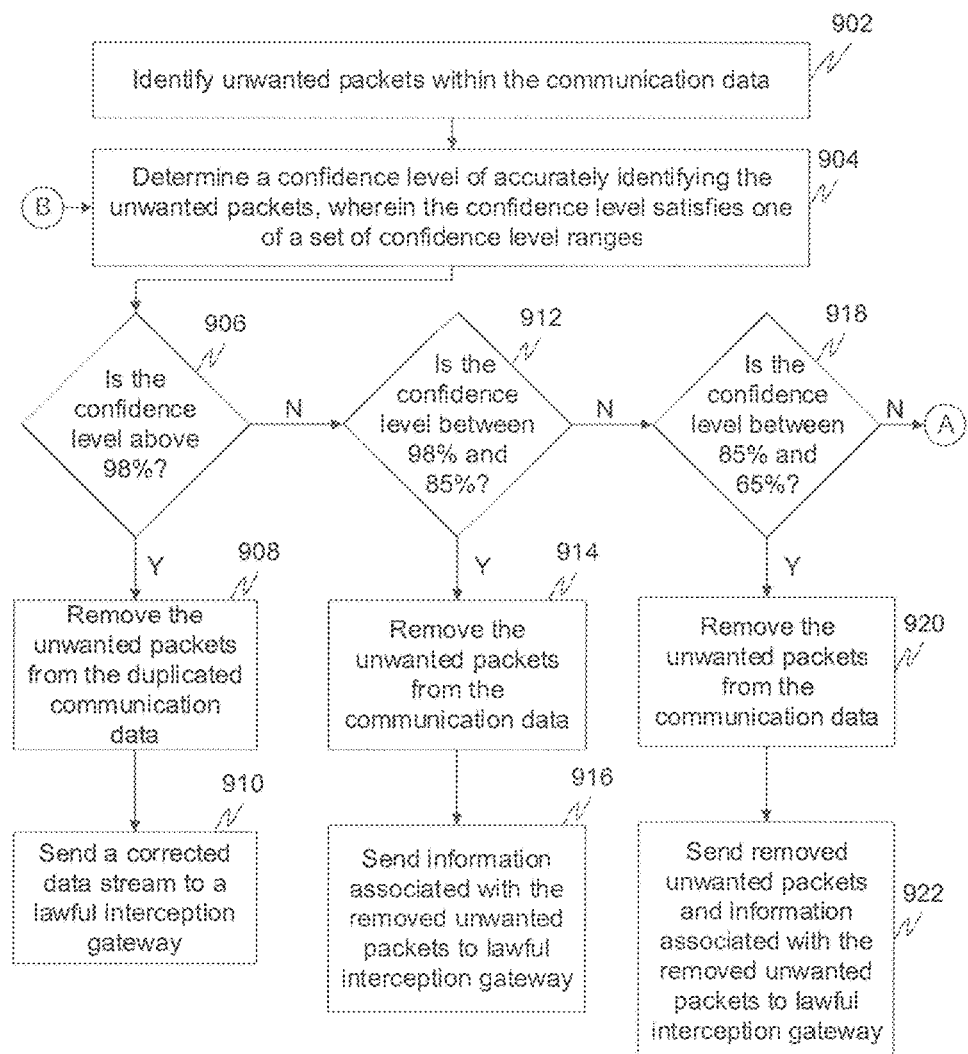
FIGS. 9A and 9B illustrate a flow chart of a method for correcting adulterated content, in accordance with an embodiment.
Figure 9B:
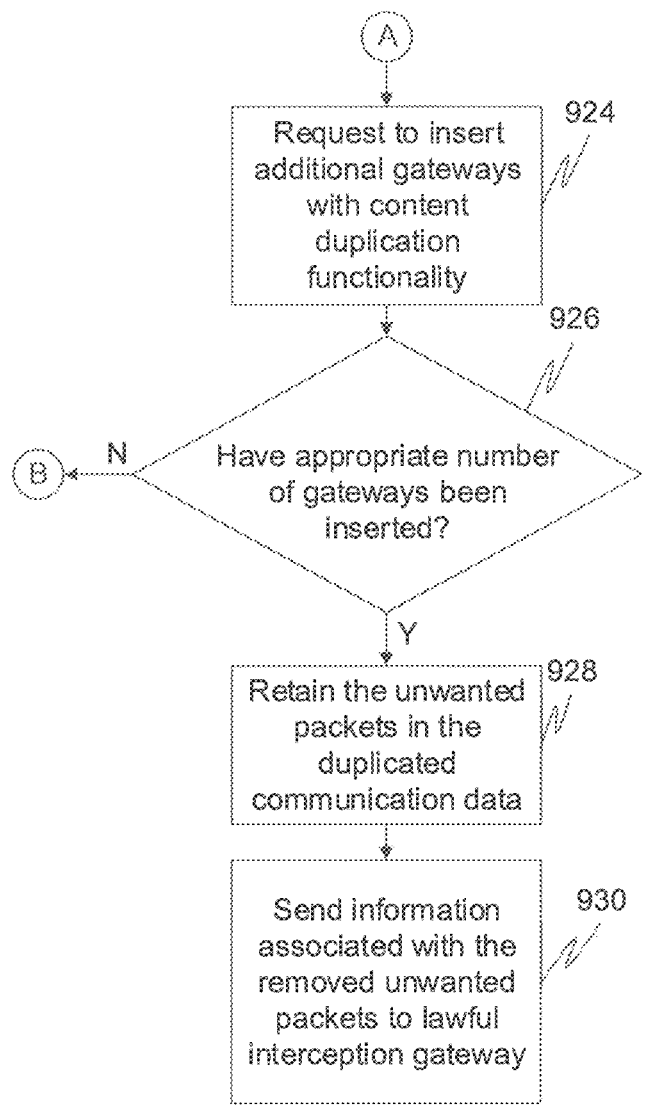

Referring now to FIGS. 9A and 9B, a flow chart of a method for correcting adulterated content is illustrated, in accordance with an embodiment. After detection of adulteration in the duplicated communication data, in order to attempt to correct the adulteration, unwanted packets within the duplicated communication data are identified at 902. These unwanted packets are the cause of adulteration in the communication data and include garbage or misleading content. Thereafter, at 904, a confidence level of accurately identifying the unwanted packets is determined. There are a set of confidence level ranges, such that, the confidence level satisfies one of these confidence level ranges. A confidence level represents the probability of identifying the packet correctly as being unwanted. The probability, for example, may be computed based on the match between the packet and its acknowledgement. The set of confidence level ranges as indicated above may be provisioned by LEA 108. At 906, a check is performed to determine whether the confidence level is above 98 percent. If the confidence level is above 98 percent, the unwanted packets are removed from the duplicated communication data at 908. Thereafter, at 910, a corrected data stream is sent to LIG 112.

Referring back to 906, if the confidence level is below or equal to 98 percent, a check is performed at 912 to determine if the confidence level is between 98 and 85 percent. If the confidence level is between 98 and 85 percent, then at 914 the unwanted packets are removed from the communication data. Thereafter, information associated with the removed unwanted packets is also sent to LIG 112 at 916.

Referring back to 912, if the confidence level is below 85 percent, a check is performed at 918 to determine if the confidence level is 65 percent or higher and below 85 percent. If the confidence level is 65 percent or higher and below 85 percent, the unwanted packets are removed from the communication data at 920. Thereafter, removed unwanted packets are sent along with information associated with the removed unwanted packets to LIG 112 at 922. Additionally, information received from other gateways having content duplication functionality may also be sent to LIG 112.

Referring back to 918, if the confidence level is below 65 percent, a request is sent to CDE selection module 404 to insert additional gateways with content duplication functionality at 924. The unwanted packets are not removed in this case. Thereafter, at 926, a check is performed to determine if an appropriate number of gateways that have content duplication functionality have already been inserted. If an appropriate number of gateways has not been already inserted, control goes back to 904. However, if an appropriate number of gateways has already been inserted, the unwanted packets are retained at 928. Thereafter, at 930, information associated with the unwanted packets is sent through to LIG 112. In all above scenarios, confidence level of identification is also sent to LIG 112, in order to aid further processing by LIG 112.

Figure 10:
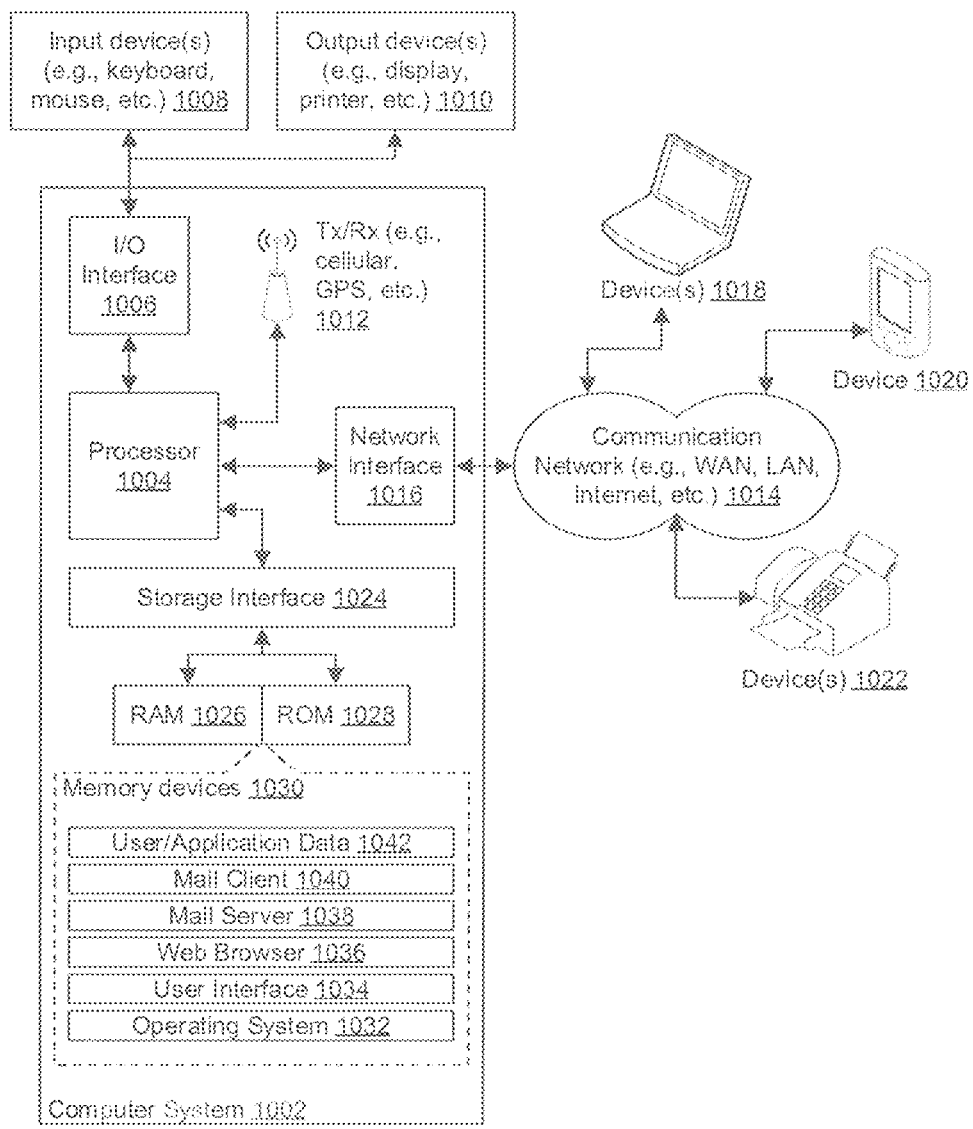
FIG. 10 illustrates a block diagram of an exemplary computer system for implementing various embodiments.

FIG. 10 is a block diagram of an exemplary computer system for implementing various embodiments. Computer system 1002 may comprise a central processing unit ("CPU" or "processor") 1004. Processor 1004 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1004 may be disposed in communication with one or more input/output (I/O) devices via an I/O interface 1006. I/O interface 1006 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 1006, computer system 1002 may communicate with one or more I/O devices. For example, an input device 1008 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 1010 may be a printer, fax machine, video display (e.g., cathode ray tube (CRT), liquid crystal display (LCD), light-emitting diode (LED), plasma, or the like), audio speaker, etc. In some embodiments, a transceiver 1012 may be disposed in connection with processor 1004. Transceiver 1012 may facilitate various types of wireless transmission or reception. For example, transceiver 1012 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 1004 may be disposed in communication with a communication network 1014 via a network interface 1016. Network interface 1016 may communicate with communication network 1014. Network interface 1016 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 1014 may include, without limitation, a direct interconnection, local area network (LAN), wide area network (WAN), wireless network (e.g., using Wireless Application Protocol), the Internet, etc. Using network interface 1016 and communication network 1014, computer system 1002 may communicate with devices 1018, 1020, and 1022. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 1002 may itself embody one or more of these devices.

In some embodiments, processor 1004 may be disposed in communication with one or more memory devices (e.g., RAM 1026, ROM 1028, etc.) via a storage interface 1024. Storage interface 1024 may connect to memory devices 1030 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 1030 may store a collection of program or database components, including, without limitation, an operating system 1032, a user interface application 1034, a web browser 1036, a mail server 1038, a mail client 1040, a user/application data 1042 (e.g., any data variables or data records discussed in this disclosure), etc. Operating system 1032 may facilitate resource management and operation of the computer system 1002. Examples of operating system 1032 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1034 may facilitate display, execution, interaction, manipulation, or operation of program components through textual or graphical facilities. For example, user interfaces may provide computer interaction interface elements on a display system operatively connected to computer system 1002, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 1002 may implement web browser 1036 stored program component. Web browser 1036 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 1002 may implement mail server 1038 stored program component. Mail server 1038 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 1002 may implement mail client 1040 stored program component. Mail client 1040 may be a mail viewing application, such as Apple Mail, Microsoft Entourage, Microsoft Outlook, Mozilla Thunderbird, etc.

In some embodiments, computer system 1002 may store user/application data 1042, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described methods and systems for performing lawful interception in a communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for performing lawful interception in a communication network, the method comprising:

activating, selectively, communication data duplication functionality in at least one of a plurality of network devices, each of the plurality of network devices being located in separate network segments of a communication path between users, the data duplication functionality duplicates data being communicated between the users;

comparing, in real-time, a set of adulteration parameters derived from duplicated communication data received from the at least one of the plurality of network devices with associated thresholds within a set of thresholds to detect adulteration in the duplicated communication data;

determining a confidence level of detecting adulteration in duplicated communication data received from the at least one of the plurality of network devices; and modifying a number of network devices having active communication data duplication functionality based on a result of the comparing and the confidence level, wherein modifying comprises inserting, relocating, or removing a network device of the plurality of network devices.

2. The method of claim 1 further comprising receiving the duplicated communication data from the at least one of the plurality of network devices.

3. The method of claim 1 further comprising detecting location and activity of colluding agents, the selective activation of communication data duplication functionality being in response to the detecting.

4. The method of claim 3, wherein modifying comprises altering location of the at least one of the plurality of network devices based on the confidence level determined, an altered location being close to one of a user and a colluding agent.

5. The method of claim 1, wherein comparing comprises:
determining similarities in adulteration parameters in duplicated communication data received from the at least one of the plurality of network devices;
determining extent of overlap between thresholds breached by adulteration parameters in duplicated communication data received from the at least one of the plurality of network devices;
computing a difference in number of packets in the duplicated communication data received from the at least one of the plurality of network devices; and
determining extent of abnormal difference in contents of packets in the duplicated communication data received from the at least one of the plurality of network devices.

6. The method of claim 1, wherein modifying comprises:
activating communication data duplication functionality in additional network devices when the confidence level is below a predefined threshold; and
deactivating communication data duplication functionality in a subset of the at least one of the plurality of network devices when the confidence level is above the predefined threshold.

7. The method of claim 1, wherein the set of adulteration parameters are selected from a group comprising packets with insufficient hop length, filling unused protocol headers, invalid, not used, or intentionally misleading Real-time Transport Protocol (RTP) header contents, interval between retransmission of the same packet, difference in content of retransmitted packet, unacceptable protocol or packet header values, port changes, reset and other flag adulterations, packets with insufficient or invalid Time-To-Live (TTL) contents, and packets with content length lower than the minimum possible content length for that packet type or protocol.

8. The method of claim 1 further comprising monitoring a set of network parameters to detect a change in one or more of the set of network parameters.

9. The method of claim 8, wherein the set of network parameters are selected from a group comprising network congestion, network choke, packet queueing, buffer overflows, insufficient network coverage, link unavailability, network delays, packet drops, and users involved in session for the communication data.

10. The method of claim 8 further comprising dynamically adapting at least one of the set of thresholds in response to detecting a change in at least one of the set of network parameters.

11. The method of claim 1 further comprising correcting, selectively, adulteration in the duplicated communication data based on satisfaction of predefined criteria.

12. The method of claim 11, wherein the predefined criteria comprises meeting a confidence level of accuracy in correcting the adulterated content.

13. The method of claim 1 further comprising an auto-tuning method of lawful interception, auto-tuning comprising adapting the set of thresholds for future communication sessions involving the users and learning appropriate number of network devices having active communication data duplication functionality to be activated to detect adulteration in future communication sessions involving the users.

14. A system for performing lawful interception in a communication network, the system comprising:
at least one processor; and
a non-transitory computer-readable medium storing instructions that, when executed by the at least one processor, cause the at least one processor to perform operations comprising:
activating, selectively, communication data duplication functionality in at least one of a plurality of network devices, each of the plurality of network devices being located in separate network segments of a communication path between users, the data duplication functionality duplicates data being communicated between the users;
comparing, in real-time, a set of adulteration parameters derived from duplicated communication data received from the at least one of the plurality of network devices with associated thresholds within a set of thresholds to detect adulteration in the duplicated communication data;
determining a confidence level of detecting adulteration in duplicated communication data received from the at least one of the plurality of network devices; and
modifying a number of network devices having active communication data duplication functionality based on a result of the comparing and the confidence level, wherein modifying comprises inserting, relocating, or removing a network device of the plurality of network devices.

15. The system of claim 14, wherein the operations further comprise receiving the duplicated communication data from the at least one of the plurality of network devices.

16. The system of claim 14, wherein the operations further comprise detecting location and activity of colluding agents, the selective activation of communication data duplication functionality being in response to the detecting.

17. The system of claim 14, wherein the operation of comparing comprises operations of:
determining similarities in adulteration parameters in duplicated communication data received from the at least one of the plurality of network devices;
determining extent of overlap between thresholds breached by adulteration parameters in duplicated communication data received from the at least one of the plurality of network devices;
computing a difference in number of packets in the duplicated communication data received from the at least one of the plurality of network devices; and
determining extent of abnormal difference in contents of packets in the duplicated communication data received from the at least one of the plurality of network devices.

18. The system of claim 14, wherein the operation of modifying comprises operations of:
activating communication data duplication functionality in additional network devices when the confidence level is below a predefined threshold; and
deactivating communication data duplication functionality in a subset of the at least one of the plurality of network devices when the confidence level is above the predefined threshold.

19. The system of claim 14, wherein the operations further comprise monitoring a set of network parameters to detect a change in one or more of the set of network parameters.

20. The system of claim 19, wherein the operations further comprise dynamically adapting at least one of the set of thresholds in response to detecting a change in at least one of the set of network parameters.

21. The system of claim 14, wherein the operations further comprise correcting, selectively, adulteration in the duplicated communication data based on satisfaction of predefined criteria.

22. The system of claim 21, wherein the predefined criteria comprises meeting a confidence level of accuracy in correcting the adulterated content.

23. A non-transitory computer-readable storage medium for performing lawful interception in a communication network, when executed by a computing device, cause the computing device to:
　　activate, selectively, communication data duplication functionality in at least one of a plurality of network devices, each of the plurality of network devices being located in separate network segments of a communication path between users, the data duplication functionality duplicates data being communicated between the users;
　　compare, in real-time, a set of adulteration parameters derived from duplicated communication data received from the at least one of the plurality of network devices with associated thresholds within a set of thresholds to detect adulteration in the duplicated communication data;
　　determine a confidence level of detecting adulteration in duplicated communication data received from the at least one of the plurality of network devices; and
　　modify a number of network devices having active communication data duplication functionality based on a result of the comparing and the confidence level, wherein modifying comprises inserting, relocating, or removing a network device of the plurality of network devices.

* * * * *